US008907243B2

(12) United States Patent
Watanabe et al.

(10) Patent No.: US 8,907,243 B2
(45) Date of Patent: Dec. 9, 2014

(54) MAINTENANCE SYSTEM FOR WIRE TRANSPORT SYSTEM OF WIRE DISCHARGE PROCESSING MACHINE

(75) Inventors: Kohtaroh Watanabe, Tokyo (JP); Kazushi Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 588 days.

(21) Appl. No.: 13/263,246

(22) PCT Filed: Apr. 7, 2009

(86) PCT No.: PCT/JP2009/001618
§ 371 (c)(1),
(2), (4) Date: Oct. 6, 2011

(87) PCT Pub. No.: WO2010/116412
PCT Pub. Date: Oct. 14, 2010

(65) Prior Publication Data
US 2012/0037601 A1    Feb. 16, 2012

(51) Int. Cl.
*B23H 7/10* (2006.01)
*B23H 7/20* (2006.01)
*B65H 63/00* (2006.01)
*B65H 59/40* (2006.01)
*B65H 59/38* (2006.01)

(52) U.S. Cl.
CPC .................. *B23H 7/10* (2013.01); *B23H 7/104* (2013.01); *B65H 63/00* (2013.01); *B65H 59/40* (2013.01); *B65H 2701/36* (2013.01); *B23H 7/20* (2013.01); *B65H 59/388* (2013.01)
USPC ....................... 219/69.12; 219/69.13; 700/162

(58) Field of Classification Search
CPC ............ B23H 7/10; B23H 7/104; B23H 7/20; B65H 598/388; B65H 59/40; B65H 63/00; B65H 2701/36; G05B 2219/45221

USPC ................... 219/69.12, 69.13, 69.17; 700/162
See application file for complete search history.

(56) References Cited

U.S. PATENT DOCUMENTS 4,731,514 A * 3/1988 Naotake et al. ............ 219/69.12
5,081,332 A * 1/1992 Sakuragawa ............... 219/69.13
(Continued)

FOREIGN PATENT DOCUMENTS

CN    101049646 A    10/2007
CN    101376186 A    3/2009
(Continued)

OTHER PUBLICATIONS

Machine translation of Japan Patent document No. 2002-90,266, May 2014.*

(Continued)

*Primary Examiner* — Geoffrey S Evans
(74) *Attorney, Agent, or Firm* — Sughrue Mion, PLLC; Richard C. Turner

(57) ABSTRACT

The tension measuring unit that measures a physical amount corresponding to tension of a wire in a wire transport system, the fluctuation recording unit that records the physical amount measured by the tension measuring unit, the fluctuation analysis unit that obtains an average value, variation, and frequency analysis data of the recorded physical amount as an analysis result of the physical amount, the maintenance necessity determining unit that compares the analysis result with a reference value and determines whether maintenance is needed based on a comparison result and the display unit that displays a determination result are included, and it is made possible to accurately determine the time for maintenance for various components used in the wire transport system without using a measuring instrument.

14 Claims, 10 Drawing Sheets

(56) References Cited

U.S. PATENT DOCUMENTS

| | | | | |
|---|---|---|---|---|
| 5,216,217 | A | * | 6/1993 | Morishita et al. .......... 219/69.12 |
| 6,028,282 | A | * | 2/2000 | Toyonaga et al. .......... 219/69.12 |
| 6,326,577 | B1 | * | 12/2001 | Toyonaga et al. .......... 219/69.12 |
| 6,326,578 | B1 | * | 12/2001 | Hosaka ...................... 219/69.12 |
| 2002/0002417 | A1 | * | 1/2002 | Irie ................................ 700/162 |
| 2004/0251238 | A1 | * | 12/2004 | Ogata et al. ................ 219/69.12 |
| 2007/0228015 | A1 | * | 10/2007 | Kita et al. .................. 219/69.12 |
| 2008/0217300 | A1 | * | 9/2008 | Kita et al. .................. 219/69.12 |

FOREIGN PATENT DOCUMENTS

| | | | | |
|---|---|---|---|---|
| JP | 58-202726 | A | * | 11/1983 |
| JP | 59-115124 | A | | 7/1984 |
| JP | 62-287935 | A | * | 12/1987 |
| JP | 62-297025 | A | * | 12/1987 |
| JP | 63-185532 | A | * | 8/1988 |
| JP | 3-213215 | A | * | 9/1989 |
| JP | 2-116426 | A | | 5/1990 |
| JP | 3-213215 | A | | 9/1991 |
| JP | 3-264213 | A | * | 11/1991 |
| JP | 6-297247 | A | * | 10/1994 |
| JP | 7-178622 | A | | 7/1995 |
| JP | 8-118151 | A | * | 5/1996 |
| JP | 2002-90266 | A | | 3/2002 |
| JP | 2002-340711 | A | * | 11/2002 |

OTHER PUBLICATIONS

Chinese Office Action, dated Feb. 20, 2014, Application No. 2009801585768.

Chinese Office Action, Jun. 23, 2013, Chinese Patent No. 2009801585768.

* cited by examiner

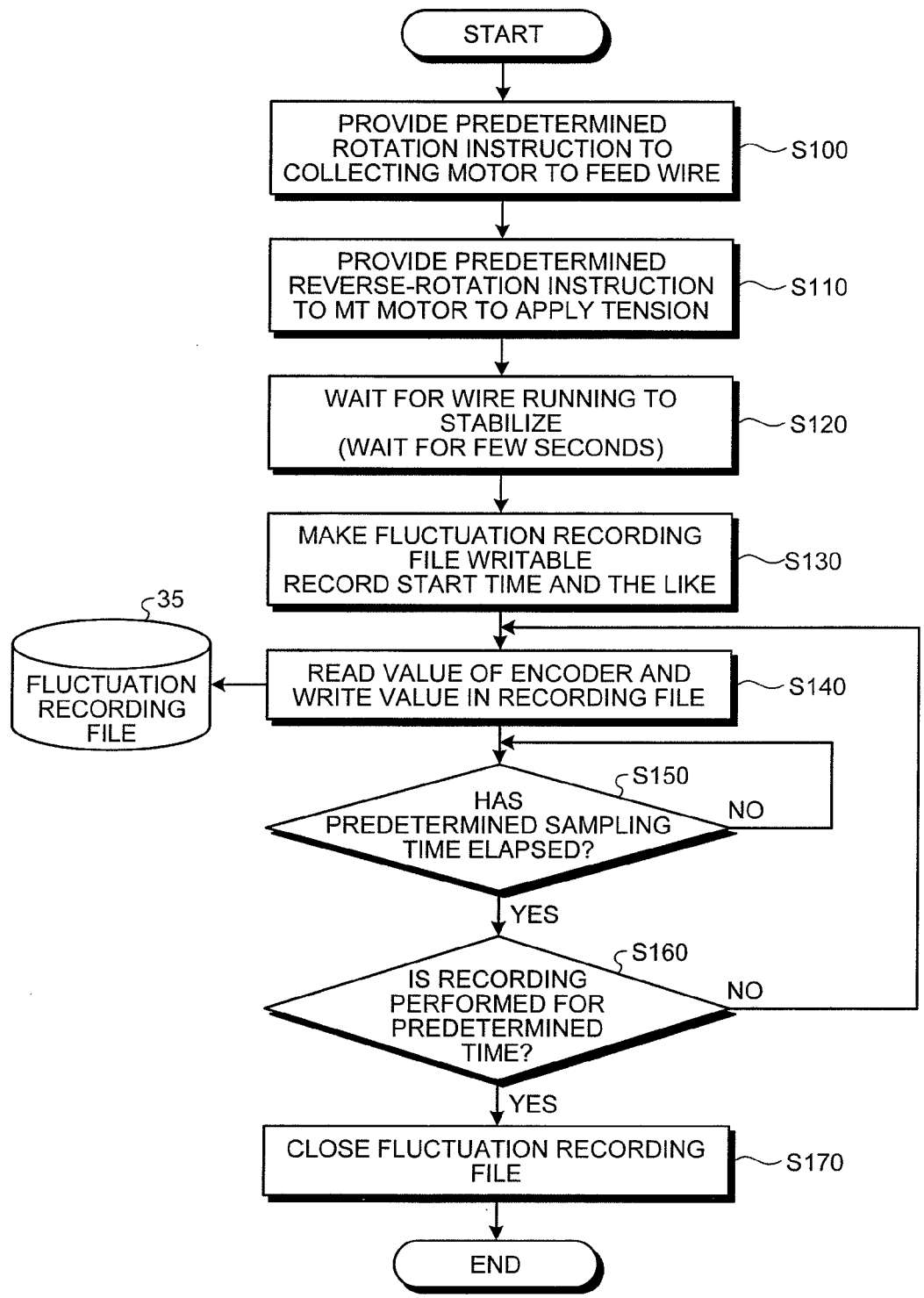

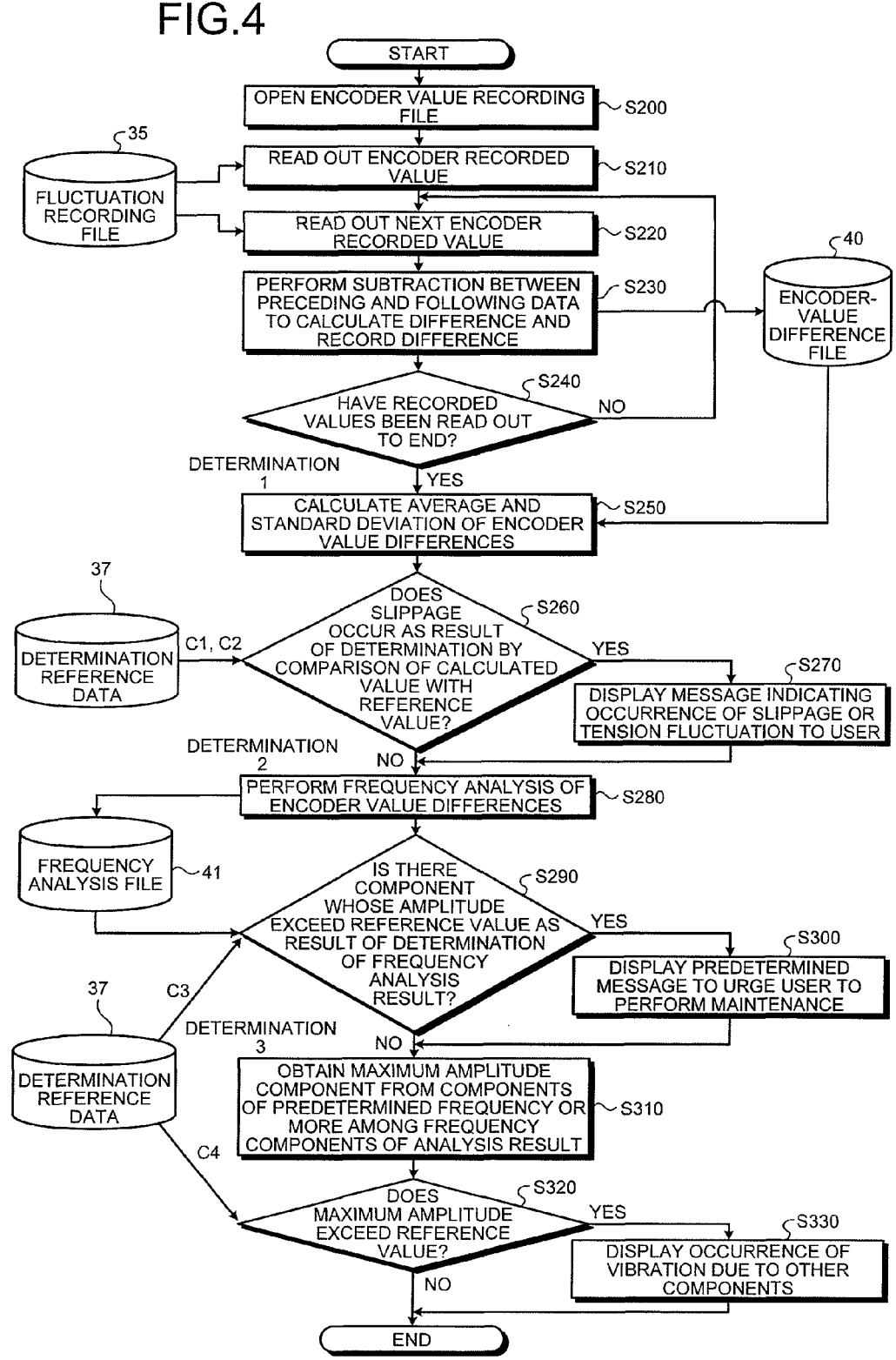

ENCODER VALUE DATA 0s (0)  TIME

DIFFERENCE DATA

TIME

FFT ANALYSIS RESULT OF DIFFERENCE DATA

SPEED FLUCTUATION AMPLITUDE

FREQUENCY

DATA EXAMPLE OF NORMAL MACHINE

DATA EXAMPLE OF MACHINE IN WHICH SLIPPAGE OCCUR

DATA ON FAVORABLE MACHINE

DATA ON MACHINE THAT NEED MAINTENANCE

FIG.8

|  | DIAMETER (mm) | NUMBER OF ROTATIONS (rpm) | CORRESPONDING FREQUENCY (Hz) | AMPLITUDE DETERMINATION VALUE C3 |
|---|---|---|---|---|
| WIRE BOBBIN | 160 | 25.925 | 0.432 | 0.5 |
| MT ROLLER | 80 | 51.849 | 0.864 | 1.0 |
| MT PINCH ROLLER | 50 | 82.959 | 1.383 | 0.7 |
| WIRE HOLDING ROLLER | 18 | 230.441 | 3.841 | 0.5 |
| LOWER ROLLER | 40 | 103.698 | 1.728 | 0.6 |
| COLLECTING ROLLER | 80 | 51.849 | 0.864 | 1.0 |
| MT MOTOR SHAFT | 40 | 103.698 | 1.728 | 0.6 |

FIG.9

FREQUENCY ANALYSIS/
REFERENCE FOR DETERMINATION

| FREQUENCY RANGE | AMPLITUDE DETERMINATION VALUE | MESSAGE |
|---|---|---|
| 0.40 TO 0.45Hz | 0.5 | VERIFICATION OF ATTACHMENT OF WIRE BOBBIN IS NEEDED |
| 0.75 TO 0.85Hz | 1.0 | MT ROLLER NEED TO BE CLEANED OR COLLECTING ROLLER NEED TO BE CLEANED |
| 1.30 TO 1.4Hz | 0.7 | PINCH ROLLER NEED TO BE CLEANED |
| 1.65 TO 1.8Hz | 0.6 | LOWER ROLLER OR MT MOTOR SHAFT NEED TO BE CLEANED |
| 3.7 TO 3.9Hz | 0.5 | WIRE HOLDING ROLLER NEED TO BE CLEANED |

MAINTENANCE SYSTEM FOR WIRE TRANSPORT SYSTEM OF WIRE DISCHARGE PROCESSING MACHINE

FIELD

The present invention relates to a maintenance system for a wire transport system of a wire discharge processing machine.

BACKGROUND

In a wire transport system of a wire discharge processing machine, it is known that occurrence of tension fluctuation in wire feeding causes effects such as generation of striations on a work and it is needed to adjust to reduce the tension fluctuation. The wire transport system is composed of components such as a plurality of pulleys and motors. If the wire discharge processing machine is used for a long period, a transport system such as a pulley wears or is decentered to cause vibration, which causes the tension fluctuation. Thus, maintenance such as component replacement is needed.

Therefore, in a conventional technology, a tension meter is attached to the wire transport system, a wire is fed at a constant speed, and the tension fluctuation is measured. When fluctuation has become large, component replacement is performed. Moreover, in Patent Literature 1, the total use time of each maintenance-needed component used in the discharge processing machine is calculated, percentage data of this total use time with respect to a reference time is calculated, and the time for replacement of each maintenance-needed component is determined based on this percentage data.

CITATION LIST

Patent Literature

Patent Literature 1: Japanese Patent Application Laid-open No. S59-115124

SUMMARY

Technical Problem

However, in the conventional technology of providing the tension meter, the tension meter is needed, so that a serviceman of a service company needs to visit a factory of a user with the measuring instrument and performs measurement for measurement of a machine of the user. Moreover, determination of which component needs to be replaced depends on the experience, so that the adjustment is costly and time-consuming. Furthermore, in the conventional technology in Patent Literature 1, the time for replacement is determined based on only the total use time of each component, so that there is a problem that the time for replacement for each component cannot be accurately determined.

The present invention is achieved in view of the above, and has an object to obtain a maintenance system for a wire transport system of a wire discharge processing machine capable of accurately determining the time for maintenance of various components used in the wire transport system without using a measuring instrument.

Solution To Problem

In order to solve the aforementioned problems and attain the aforementioned object, the maintenance system for the wire transport system of the wire discharge processing machine is provided with: a wire discharge processing machine that includes a measuring unit that measures a physical amount corresponding to tension of a wire in a wire transport system and a recording unit that records the physical amount measured by the measuring unit; an analyzing unit that obtains at least one of an average value, variation, and frequency analysis data of recorded physical amount as an analysis result of the physical amount; a determining unit that compares the analysis result with a reference value and determines whether maintenance is needed based on a comparison result; and a displaying unit that displays a determination result.

Advantageous Effects of Invention

According to the present invention, a physical amount corresponding to tension of a wire in a wire transport system is measured, at least one of an average value, variation, and frequency analysis data of the measured physical amount is obtained as an analysis result of the physical amount, and this analysis result is compared with a reference value to determine whether maintenance is needed based on a comparison result, so that it becomes possible to accurately determine the time for maintenance for various components used in the wire transport system without using a measuring instrument.

BRIEF DESCRIPTION OF DRAWINGS

FIG. 3 is a flowchart illustrating a recording operation procedure of a fluctuation recording file.

FIG. 4 is a flowchart illustrating a fluctuation analysis procedure and a maintenance necessity determination procedure.

FIG. 8 is a diagram illustrating a diameter, a corresponding frequency, and the like of each component of the wire transport system.

FIG. 9 is a diagram illustrating an amplitude determination value and a message of each frequency range of an FFT analysis result.

REFERENCE SIGNS LIST

1 WIRE FEEDING UNIT
2 UPPER WIRE GUIDE UNIT

3 LOWER WIRE GUIDE UNIT
4 WIRE COLLECTING UNIT
10 WIRE (ELECTRODE WIRE)
11 WIRE BOBBIN
13 MT ROLLER (MAIN TENSION ROLLER)
13a, 13b MT PINCH ROLLER
14 MT MOTOR
15 ENCODER
16 WIRE HOLDING ROLLER
17 LOWER ROLLER
18 COLLECTING ROLLER
18a COLLECTING PINCH ROLLER
19 COLLECTING MOTOR
20 WORK PROCESSING SPACE
31 FLUCTUATION RECORDING UNIT
31a MOTOR CONTROL UNIT
32 FLUCTUATION ANALYSIS UNIT
33 MAINTENANCE NECESSITY DETERMINING UNIT
34 DISPLAY UNIT
35 FLUCTUATION RECORDING FILE
36 FLUCTUATION ANALYSIS RESULT FILE
37 DETERMINATION REFERENCE DATA
70 WEB SERVER (SERVER)
90 WIRE DISCHARGE PROCESSING MACHINE
95 NC CONTROLLER
100 WIRE DISCHARGE PROCESSING APPARATUS
W WORK

DESCRIPTION OF EMBODIMENTS

Exemplary embodiments of a maintenance system for a wire transport system of a wire discharge processing machine according to the present invention will be explained below in detail based on the drawings. This invention is not limited to the embodiments.

First Embodiment

Figure 1:
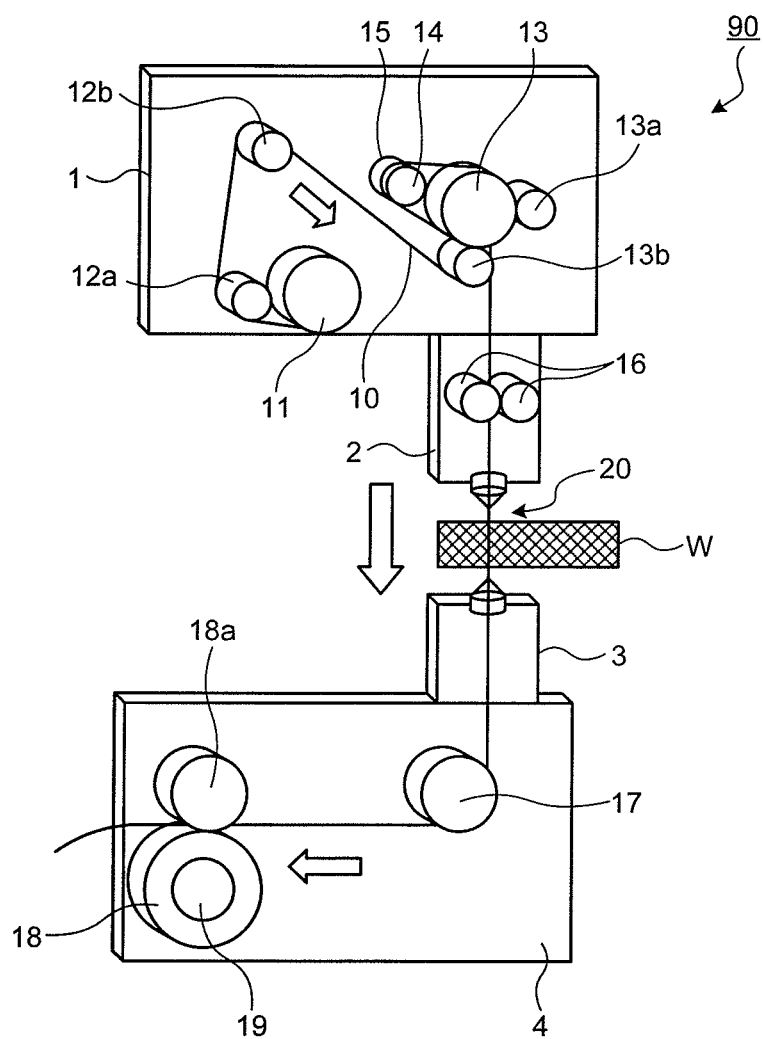
FIG. 1 is a diagram illustrating a component configuration example of a wire transport system of a wire discharge processing machine.

FIG. 1 illustrates a configuration example of a wire transport system of a wire discharge processing machine 90. As shown in FIG. 1, the wire discharge processing machine includes a wire feeding unit 1 and an upper wire guide unit 2 provided on a machine body side and a lower wire guide unit 3 and a wire collecting unit 4 provided on a working tank side.

In the wire feeding unit 1, a wire bobbin 11, on which an electrode wire (hereinafter, simply wire) 10 is wound and which pays out the electrode wire 10, feeding rollers 12a and 12b, a main tension roller (hereinafter, MT roller) 13, MT pinch rollers 13a and 13b, an MT motor 14 that belt drives the MT roller 13, and an encoder 15 attached to the rotating shaft of the MT motor 14 are included. In the upper wire guide unit 2, a pair of wire holding rollers 16 is provided. In the wire collecting unit 4, a lower roller 17, a collecting roller 18, a collecting motor 19 that rotationally drives the collecting roller 18, and a collecting pinch roller 18a are provided.

The MT roller 13 is arranged on a wire transport path between the wire bobbin 11 and the upper wire guide unit 2, and is belt driven by the MT motor 14 to brake running of the wire 10 thereby applying tension to the wire 10. The two MT pinch rollers 13a and 13b, which sandwich the wire 10 with the MT roller 13, press the MT roller 13. The wire holding rollers 16 are rotatable in a pulling and transporting direction of the wire 10 and do not rotate in an opposite direction thereto. Therefore, when the wire 10 is disconnected in a work processing space 20 while processing a work W, the wire 10 is prevented from being wound up by the MT roller 13 and being extracted out of the upper wire guide unit 2. The collecting motor 19 rotationally drives the collecting roller 18 to collect the wire 10 running between the collecting roller 18 and the collecting pinch roller 18a into a not-shown wire collecting box.

In this wire transport system, the wire 10 paid out from the wire bobbin 11 is pulled and collected at a predetermined speed via the feeding rollers 12a and 12b, the MT roller 13, the wire holding rollers 16, the work processing space 20, the lower wire guide unit 3, the lower roller 17, and the collecting roller 18 by rotationally driving the collecting motor 19 and the MT motor 14. The encoder 15 for controlling rotation of the MT motor 14 is directly connected to the rotating shaft of the MT motor 14, and encoder data (encoder pulse) as a position signal is output from the encoder 15.

Figure 2:
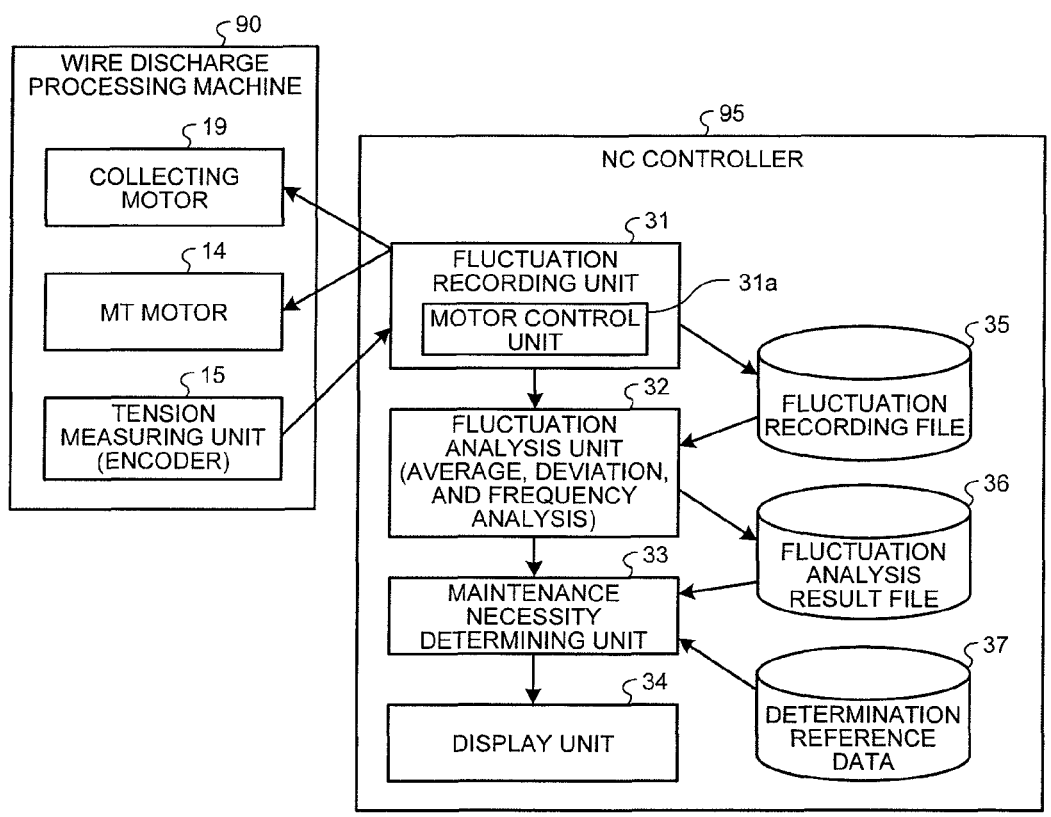
FIG. 2 is a diagram illustrating a control configuration example of a maintenance system for a wire transport system of a wire discharge processing machine according to a first embodiment.

FIG. 2 is a block diagram illustrating a maintenance system of the wire transport system according to the first embodiment. In the maintenance system according to the first embodiment, all of the necessary components are arranged in a wire discharge processing apparatus 100 arranged in a user's factory or the like. The wire discharge processing apparatus 100 includes the wire discharge processing machine 90 and an NC controller 95 that controls this wire discharge processing machine 90.

In the NC controller 95, a fluctuation recording unit 31, a fluctuation analysis unit 32, a maintenance necessity determining unit 33, and a display unit 34 are included. The fluctuation recording unit 31 includes a motor control unit 31a that controls driving of the collecting motor 19 and the MT motor 14 in a maintenance mode, and samples the output of the encoder 15 as a tension measuring unit at a predetermined sampling frequency for a predetermined time in a state where the collecting motor 19 and the MT motor 14 are driven by the motor control unit 31a and records the sampled encoder data in a fluctuation recording file 35. The fluctuation analysis unit 32 analyzes the encoder data recorded in the fluctuation recording file 35, performs calculation of an average value $\delta$ and a standard deviation $\sigma$ and performs a frequency analysis (FFT processing), and records the analysis result thereof in a fluctuation analysis result file 36. The maintenance necessity determining unit 33 determines whether maintenance is needed by comparing each analysis data recorded in the fluctuation analysis result file 36 with determination reference data 37 and displays the determination result thereof on the display unit 34. On the display unit 34, various messages indicating whether or not maintenance is needed are displayed.

FIG. 3 illustrates a data collecting procedure performed by the fluctuation recording unit 31. First, the fluctuation recording unit 31 provides a predetermined rotation instruction to the collecting motor 19 to feed the wire 10 (Step S100). Moreover, the fluctuation recording unit 31 provides a predetermined reverse-rotation instruction to the MT motor 14 to apply a required tension to the wire 10 (Step S110). Consequently, the wire 10 is fed at a predetermined speed in a state where a predetermined tension is applied to the wire 10. The fluctuation recording unit 31 waits for a predetermined time (for a few seconds) to wait for the running state of the wire to stabilize (Step S120), and thereafter, generates the fluctuation recording file 35 in which the fluctuation record of this time is to be recorded and enables writing of the fluctuation record in the fluctuation recording file 35 (Step S130). In the generated fluctuation recording file 35, required information such as date and time of the start of recording is also recorded.

Thereafter, the fluctuation recording unit 31 reads the encoder data from the encoder 15 at a predetermined sampling frequency for a predetermined time and sequentially records the read encoder data in the fluctuation recording file 35 (Steps S140 to S160). After finishing the data recording for the predetermined time, the fluctuation recording file 35 is closed (Step S170).

Figure 5A:
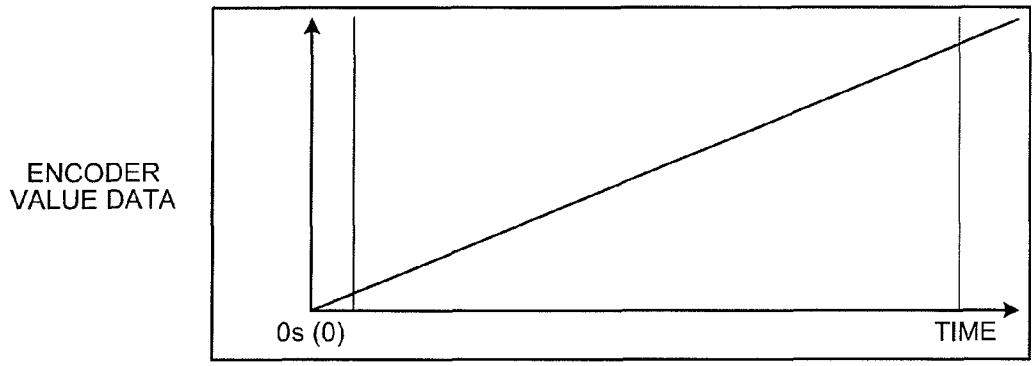
FIG. 5 is a diagram illustrating an encoder data waveform, an encoder difference data waveform, and an EFT analysis waveform.

FIG. 4 illustrates a procedure of a fluctuation analysis process performed by the fluctuation analysis unit 32 and a procedure of a maintenance necessity determination process performed by the maintenance necessity determining unit 33. The fluctuation analysis unit 32 opens the recorded fluctuation recording file 35 (Step S200) and reads out an encoder recorded value at the first sampling time and an encoder recorded value at the next second sampling time from the opened fluctuation recording file 35 (Steps S210 and S220). FIG. 5A illustrates time-series data of the encoder pulse sampled at a predetermined sampling frequency for a predetermined time.

Figure 5B:
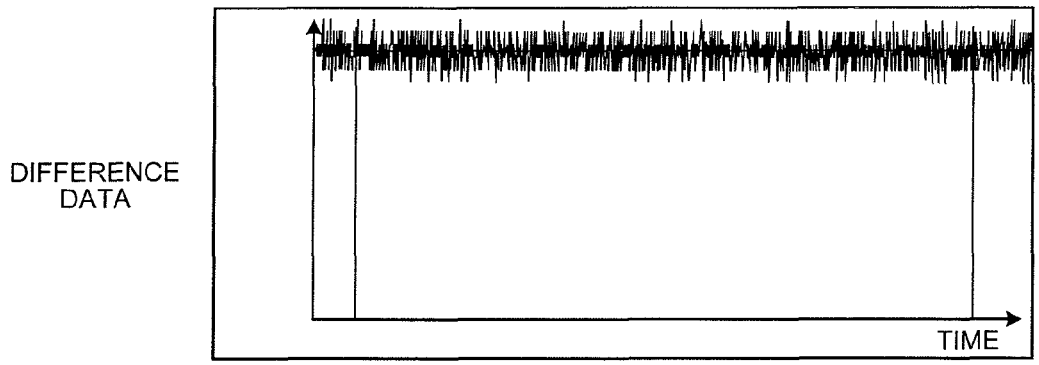

The fluctuation recording unit 31 calculates the rotation speed of the MT motor 14 by taking a derivative of the encoder data by calculating the difference between the encoder recorded value at the first sampling time and the encoder recorded value at the second sampling time that are read out, and records the calculated difference data (speed data) in an encoder-value difference file 40. Next, the fluctuation recording unit 31 reads out an encoder recorded value at the third sampling time from the fluctuation recording file 35, calculates the rotation speed of the MT motor 14 by calculating the difference between the encoder recorded value at the second sampling time and the encoder recorded value at the third sampling time, and records the calculated difference data (speed data) in the encoder-value difference file 40. Such process is repeated to obtain a number of pieces of difference data corresponding to the number of samples (Steps S230 and S240). FIG. 5B illustrates an example of the difference data corresponding to the encoder data shown in FIG. 5A.

The fluctuation analysis unit 32 calculates the average value δ and variation (for example, the standard deviation σ) of the encoder difference data recorded in the encoder-value difference file 40 (Step S250). The maintenance necessity determining unit 33 compares the calculated average value δ with a reference value C1. When the average value δ falls below the reference value C1, the maintenance necessity determining unit 33 determines that the slippage occurs in the wire transport system and therefore the tension value decreases, and displays that effect on the display unit 34 (Steps S260:Yes and S270). Moreover, the maintenance necessity determining unit 33 compares the calculated standard deviation σ with a reference value C2. When the standard deviation σ exceeds the reference value C2, the maintenance necessity determining unit 33 determines that the tension fluctuation occurs in the wire transport system and displays that effect on the display unit 34 (Steps S260:Yes and S270).

Figure 6A:
FIG. 6 is a diagram illustrating encoder difference data waveforms of a normal machine and a machine in which slippage occurs.
Figure 6B:
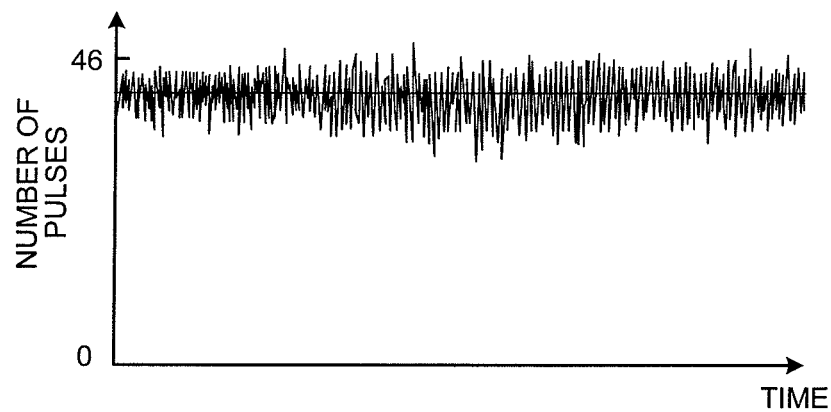

FIG. 6A illustrates a waveform of the difference data of a normal machine and FIG. 6B illustrates a waveform of the difference data of a machine in which the slippage and the tension fluctuation occur. As shown in FIG. 6A, in the case of a normal machine, for example, the average δ of the number of passes of the encoder pulse per predetermined time (in this case, 14.22 ms) takes a value around 48, and the standard deviation σ is lower than 1. On the contrary, as shown in FIG. 6B, in the case of a machine in which the slippage occurs, for example, the average δ of the number of passes of the encoder pulse per predetermined time (in this case, 14.22 ms) is lower than 45, and, in the case where the tension fluctuation occurs, the standard deviation σ exceeds 2. Appropriate reference values C1 and C2 are set in view of the behavior of such machines.

Next, the fluctuation analysis unit 32 performs the frequency analysis (FFT processing) of the encoder difference data (Step S280) and stores the frequency analysis result in a frequency analysis file 41. The maintenance necessity determining unit 33 determines abnormality in each unit in the wire transport system individually based on the frequency analysis result stored in the frequency analysis file 41 (Step S290). A predetermined message is displayed on the display unit 34 in accordance with the presence or absence of occurrence of abnormality to urge a user to perform maintenance (Step S290: Yes, Step S300).

Figure 5C:
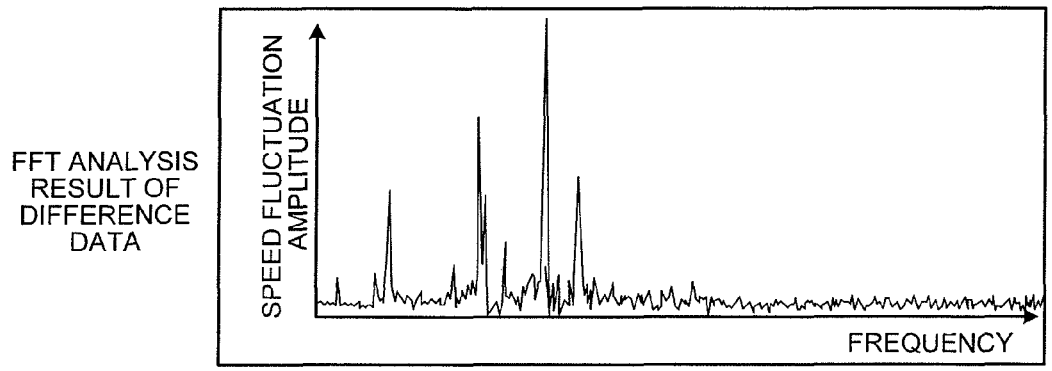

FIG. 5C illustrates the frequency analysis result of the encoder difference data shown in FIG. 5B, in which a horizontal axis indicates a frequency and a vertical axis indicates a speed fluctuation amplitude as an output level. Moreover, FIG. 7A(a) illustrates the frequency analysis result of a favorable machine that does not need maintenance and FIG. 7B illustrates the frequency analysis result of a machine that needs maintenance. Moreover, FIG. 8 illustrates a diameter, the number of rotations, and the like of various components of the wire transport system used in the frequency analysis shown in FIG. 7. FIG. 8 illustrates a frequency (corresponding frequency) corresponding to each component in the frequency analysis result and an amplitude determination value C3 for performing abnormality determination (maintenance necessity determination) from the frequency analysis result, for each component.

As shown in FIG. 8, the diameter (mm) of each component is such that the wire bobbin 11 is 160, the MT roller 13 is 80, the MT pinch rollers 13a and 13b are 50, the wire holding roller 16 is 18, the lower roller 17 is 40, the collecting roller 18 is 80, and the rotating shaft of the MT motor 14 is 40, and the relative positions on the frequency axis in the frequency analysis result are determined by the diameter of each of these components. In the frequency analysis results shown in FIG. 7, as the encoder 15, an encoder that outputs 4000 pulses per revolution is used. If the number of rotations of the collecting motor 19 and the MT motor 14 is changed to change the feeding speed of the wire 10, the absolute value of the corresponding frequency of each component in the frequency analysis results shown in FIG. 7 changes according thereto, however, the relative positions between the corresponding frequencies of respective components basically do not change.

Figure 7A:
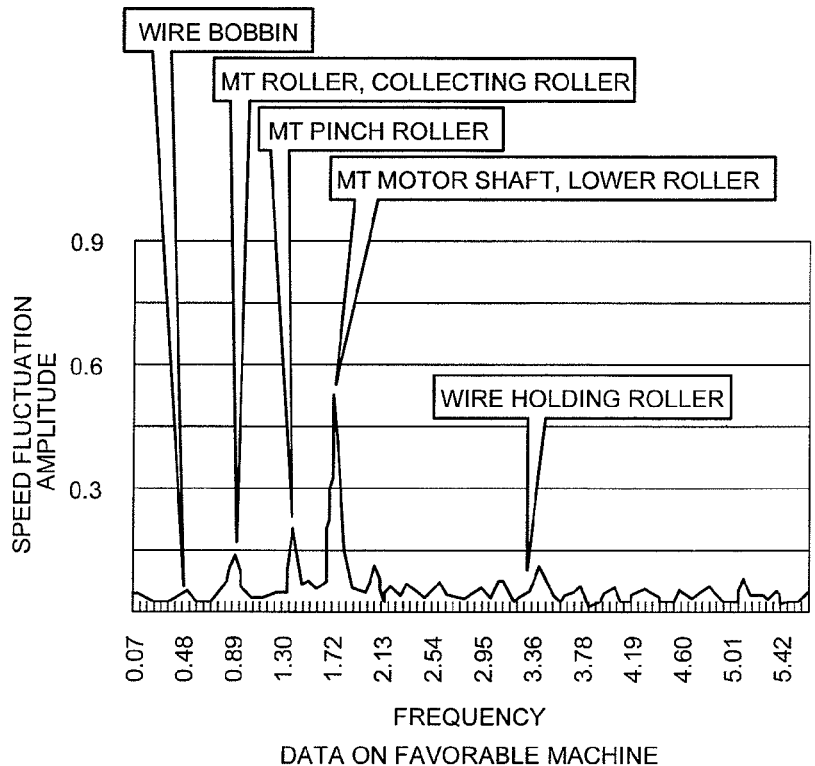
FIG. 7 is a diagram illustrating FFT analysis waveforms of a favorable machine and a machine that needs maintenance.
Figure 7B:
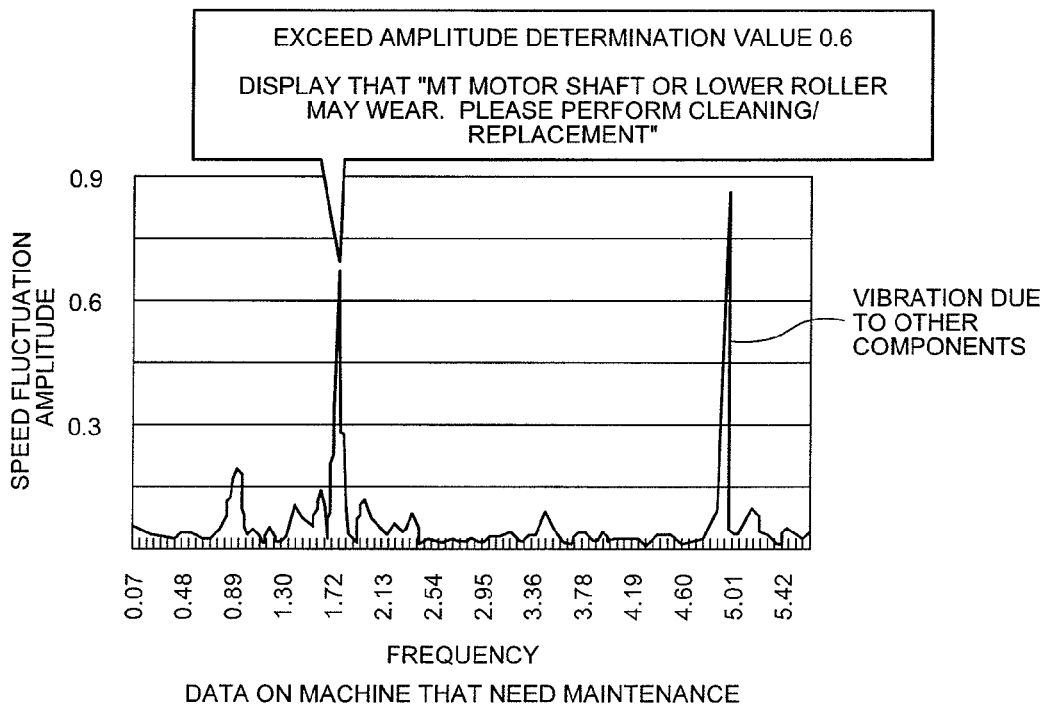

Therefore, as shown in FIG. 7A, the corresponding frequency of each component becomes lower for a component having a larger diameter and becomes higher for a component having a smaller diameter. Specifically, in this case, the corresponding frequency (Hz) of each component is such that the wire bobbin 11 is 0.432, the MT roller 13 is 0.864, the MT pinch rollers 13a and 13b are 1.383, the wire holding roller 16 is 3.841, the lower roller 17 is 1.728, the collecting roller 18 is 0.864, and the rotating shaft of the MT motor 14 is 1.728. Moreover, in FIG. 8, the amplitude determination value C3 for determining whether or not maintenance is needed for each component is set such that the wire bobbin 11 is 0.5, the MT roller 13 is 1.0, the MT pinch rollers 13a and 13b are 0.7, the wire holding roller 16 is 0.5, the lower roller 17 is 0.6, the collecting roller 18 is 1.0, and the rotating shaft of the MT motor 14 is 0.6.

The NC controller 95 includes an association table as shown in FIG. 8 indicating association among each component, the corresponding frequency range, and the amplitude determination value C3 for each component configuring the wire transport system as the determination reference data 37 shown in FIG. 2, and the maintenance necessity determining unit 33 refers to this association table to perform maintenance necessity determination using the frequency analysis result.

At Step S290 shown in FIG. 4, the maintenance necessity determining unit 33 calculates the output level (speed fluctuation amplitude) corresponding to the corresponding frequency range of each component from the frequency analysis result stored in the frequency analysis file 41, and compares the calculated output level of each corresponding frequency range with each amplitude determination value C3 registered in the association table. When there is an output level exceeding the amplitude determination value C3, for example, messages as shown in FIG. 9 are displayed on the display unit 34. As shown in FIG. 9, when over-level occurs in the corresponding frequency of 0.4 to 0.45 Hz, a message indicating that verification of attachment of the wire bobbin is needed, is displayed, when over-level occurs in the corresponding frequency of 0.75 to 0.85 Hz, a message indicating that the MT roller or the collecting roller needs to be cleaned, is displayed, when over-level occurs in the corresponding frequency of 1.3 to 1.4 Hz, a message indicating that the pinch roller needs to be cleaned, is displayed, when over-level occurs in the corresponding frequency of 1.65 to 1.8 Hz, a message indicating that the lower roller or the MT motor shaft needs to be cleaned, is displayed, and when over-level occurs in the corresponding frequency of 3.7 to 3.9 Hz, a message indicating that the wire holding roller needs to be cleaned, is displayed. With this method, it is possible to identify the state that a particular component wears or is decentered and thus causes the tension fluctuation.

Next, at Steps S310 to S330 in FIG. 4, it is determined whether vibration (vibration due to other components) due to a component other than the components shown in FIG. 8 whose corresponding frequency range is specified occurs, by using the frequency analysis result stored in the frequency analysis file 41. It is found through experiment by the inventor that the vibration due to other components often occurs in a frequency range larger than the corresponding frequency (in this case, the corresponding frequency range of 3.7 to 3.9 Hz of the wire holding roller 16 having the smallest diameter) of the roller having the smallest diameter in the frequency analysis result as shown in FIG. 7B. Therefore, at Step S310, the maintenance necessity determining unit 33 obtains the maximum amplitude component in the frequency range larger than the corresponding frequency of the roller having the smallest diameter among the frequency components of the frequency analysis result, and, when this maximum amplitude component is larger than a predetermined reference value C4, determines that the vibration due to other components occurs and displays that effect on the display unit 34 (Steps S320:Yes, and S330).

As above, in the first embodiment, the slippage in the wire transport system is detected based on the average and the variation of the speed data detected by the encoder provided in the wire transport system, so that the time for maintenance of various components used in the wire transport system can be accurately determined without using an additional measuring instrument. Moreover, in the first embodiment, the frequency analysis of the speed data detected by the encoder provided in the wire transport system is performed and it is detected for each component whether maintenance of each component configuring the wire transport system is needed based on this frequency analysis result, so that a maintenance worker need not inspect which component needs maintenance and therefore time and cost for the inspection can be reduced and maintenance workability can be improved. Moreover, in this first embodiment, it is determined whether vibration due to other components occurs based on the frequency analysis result, enabling to trigger maintenance with respect to the vibration due to other components.

In the above embodiment, the running speed of the wire is used as a physical amount for measuring the tension fluctuation of the wire transport system and the running speed of the wire is measured by the encoder 15 attached to the MT motor 14, however, the running speed of the wire can be measured by detecting the running speed of the collecting motor 19, the wire holding rollers 16, the lower roller 17, or the like provided in the wire transport system. Moreover, an encoder is employed as a measuring unit that measures the running speed of a roller or a motor, however, the running speed can be detected by other arbitrary detecting units. Furthermore, as a physical amount for measuring the tension fluctuation of the wire transport system, a load on the wire can be detected by a load cell other than the running speed of the wire, and moreover the tension fluctuation of the wire transport system can be measured by using other physical amounts.

Moreover, it is applicable to prepare the association table indicating association among each component, the corresponding frequency range, and the amplitude determination value C3 shown in FIG. 8 for each model of the wire discharge processing machine and select the association table depending on the model.

Furthermore, in the first embodiment, the first determination using the average and the variation of the encoder difference data, the second determination as determination of whether maintenance is needed for each component based on the frequency analysis result of the encoder difference data, and the third determination as the vibration determination due to other components are performed, however, it is applicable to determine whether maintenance is needed for the wire discharge processing machine by performing at least one of these three determinations.

Second Embodiment

Figure 10:
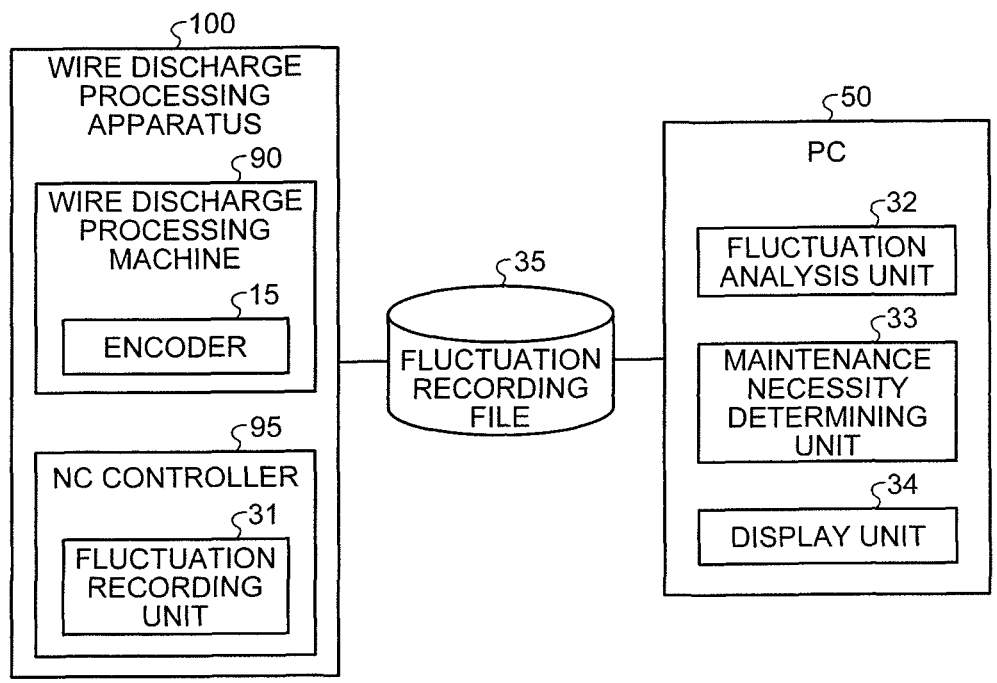
FIG. 10 is a diagram illustrating a control configuration example of a maintenance system for a wire transport system of a wire discharge processing machine according to a second embodiment.

FIG. 10 illustrates a configuration example of a maintenance system for a wire transport system in the second embodiment. In this second embodiment, in the wire discharge processing apparatus 100, the encoder data in the encoder 15 of the wire discharge processing machine 90 is recorded in the fluctuation recording file 35 in the similar manner to the above by the fluctuation recording unit 31 provided in the NO controller 95. In the NC controller 95, an external interface is provided, with which the fluctuation recording file 35 recorded by the fluctuation recording unit 31 can be extracted to the outside as an electronic file.

On the other hand, in a personal computer (PC) 50 of a maintenance worker, the fluctuation analysis unit 32, the maintenance necessity determining unit 33, and the display unit 34 similar to those in the first embodiment are provided, so that determination of a fluctuation factor of the wire tension, determination of whether maintenance and inspection are needed, and determination of whether vibration due to other components occurs can be performed by the PC 50 of the maintenance worker. The fluctuation analysis unit 32, the maintenance necessity determining unit 33, and the display unit 34 can be mounted on any personal computer other than the personal computer of the maintenance worker.

Third Embodiment

Figure 11:
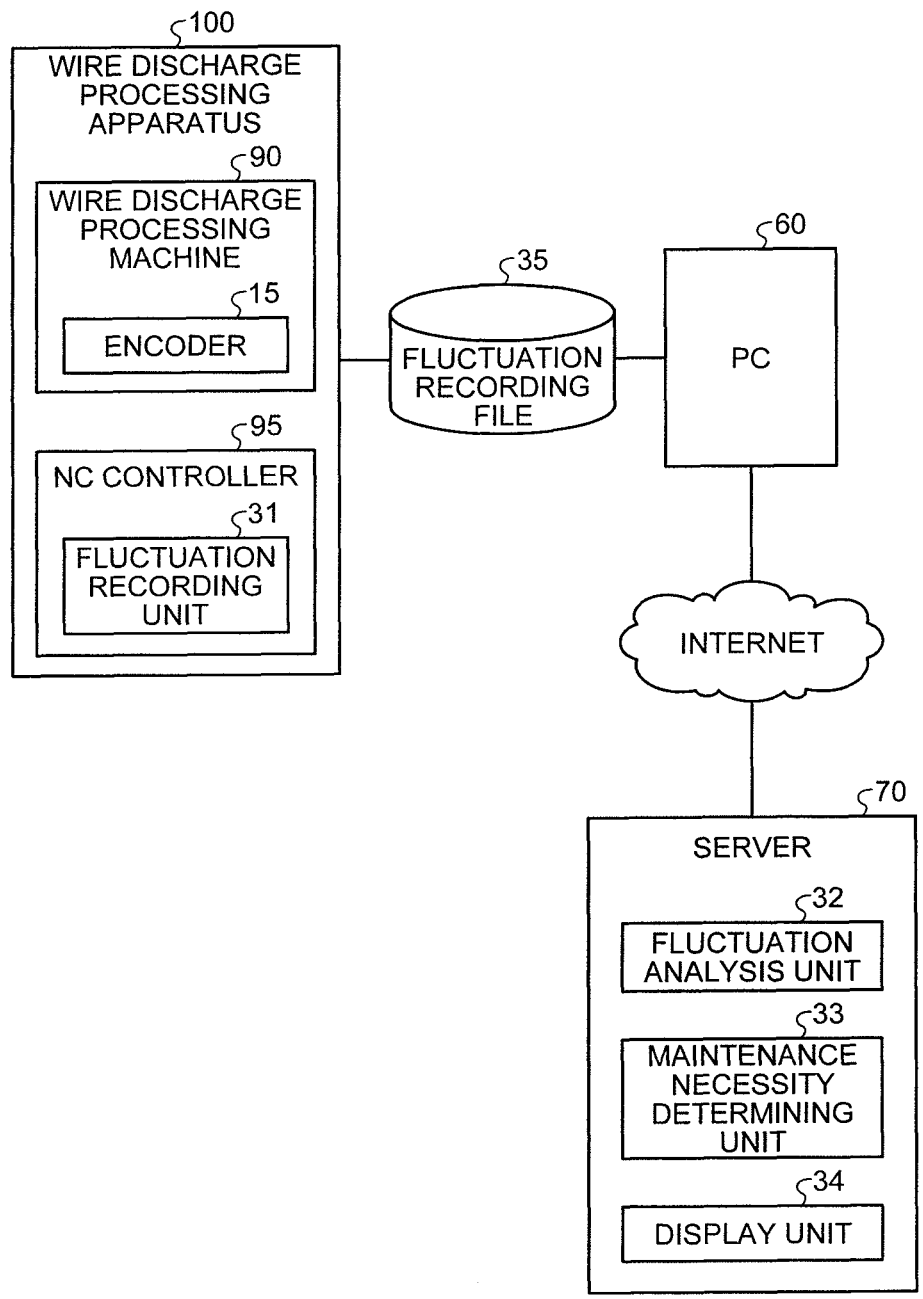
FIG. 11 is a diagram illustrating a control configuration example of a maintenance system for a wire transport system of a wire discharge processing machine according to a third embodiment.

FIG. 11 is a block diagram illustrating a configuration example of a maintenance system for a wire transport system in the third embodiment. The maintenance system for the wire transport system of the third embodiment includes the wire discharge processing apparatus 100 and a web server (server) 70. In the wire discharge processing apparatus 100, the encoder data in the encoder 15 of the wire discharge processing machine 90 is recorded in the fluctuation recording file 35 in the similar manner to the above by the fluctuation recording unit 31 provided in the NC controller 95. In the NC controller 95, an external interface is provided, with which the fluctuation recording file 35 recorded by the fluctuation recording unit 31 can be extracted to the outside as an electronic file.

Moreover, on the server 70 connected to the Internet, the fluctuation analysis unit 32, the maintenance necessity determining unit 33, and the display unit 34 similar to those in the first embodiment are provided. In this system in the third embodiment, for example, the server 70 is accessed from a PC 60 in a user's factory or the like and the fluctuation recording file 35 is uploaded to the server 70, whereby the server 70 performs determination of a variation factor of the wire tension, determination of whether or not maintenance and inspection are needed, and determination of whether or not vibration due to other components occurs in the similar manner to the above and displays the determination result on the PC 60. A user in a user's factory can determine whether or not maintenance is needed and the like by referring to the determination result displayed on the PC 60.

Industrial Applicability

The maintenance system and the maintenance method for the wire transport system according to the present invention are useful for maintenance of a wire discharge processing machine.

The invention claimed is:

1. A maintenance system for a wire transport system of a wire discharge processing machine comprising:
 a wire discharge processing machine that includes a measuring unit that measures a physical amount corresponding to tension of a wire in a wire transport system and a recording unit that records the physical amount measured by the measuring unit;
 an analyzing unit that obtains at least one of an average value, variation from the average value, and frequency analysis data of the recorded physical amount as an analysis result of the physical amount;
 a determining unit that compares the analysis result with a reference value and determines whether or not maintenance is needed based on a comparison result; and
 a displaying unit that displays a determination result.

2. The maintenance system for the wire transport system of the wire discharge processing machine according to claim 1, wherein the determining unit determines that maintenance is needed when the average value falls below a first reference value, and determines that maintenance is needed when the variation exceeds a second reference value.

3. The maintenance system for the wire transport system of the wire discharge processing machine according to claim 1, wherein the analyzing unit, the determining unit, and the displaying unit are mounted on the wire discharge processing machine.

4. The maintenance system for the wire transport system of the wire discharge processing machine according to claims 1, wherein the analyzing unit, the determining unit, and the displaying unit are mounted on a personal computer.

5. The maintenance system for the wire transport system of the wire discharge processing machine according to claim 1, wherein the analyzing unit, the determining unit, and the displaying unit are mounted on a server accessible through Internet.

6. The maintenance system for the wire transport system of the wire discharge processing machine according to claim 1, wherein the variation from the average value is standard deviation of the recorded physical amount.

7. The maintenance system for the wire transport system of the wire discharge processing machine according to claim 1, wherein the recorded physical amount is difference data obtained by calculating a difference between a recorded value at a first sampling time and a recorded value at a second sampling time.

8. The maintenance system for the wire transport system of the wire discharge processing machine according to claim 1, wherein the frequency analysis is performed by utilizing Fast Fourier Transform (FFT) processing.

9. The maintenance system for the wire transport system of the wire discharge processing machine according to claim 1, wherein the measuring unit measures a running speed of the wire.

10. The maintenance system for the wire transport system of the wire discharge processing machine according to claim 9, wherein the measuring unit measures speed data obtained by differentiating encoder data output from an encoder attached to a rotating component of the wire transport system, as the physical amount.

11. The maintenance system for the wire transport system of the wire discharge processing machine according to claim 1, wherein
 the determining unit includes an association table in which a plurality of components included in the wire transport system, corresponding frequency ranges in the frequency analysis data, and third reference values are associated,
 the determining unit compares an output level of each of the corresponding frequency ranges in the frequency analysis data with a corresponding third reference value, and determines whether or not maintenance is needed for each component by determining that maintenance is needed when each output level exceeds a corresponding third reference value, and
 the displaying unit displays a determination result in each of the component units.

12. The maintenance system for the wire transport system of the wire discharge processing machine according to claim 11, wherein a relationship between a plurality of components, corresponding frequency ranges, and third reference values is set for each model, in the association table.

13. The maintenance system for the wire transport system of the wire discharge processing machine according to claim 11, wherein the determining unit, when an output level exceeding a fourth reference value occurs in a frequency range larger than a maximum corresponding frequency range among the corresponding frequency ranges of the plurality of components, determines as occurrence of vibration due to a component other than the components registered in the association table.

14. A maintenance method for a wire transport system of the wire discharge processing machine comprising:
 a measuring step of measuring a physical amount corresponding to tension of a wire in a wire transfer system;
 a recording step of recording measured physical amount;
 an analyzing step of obtaining at least one of an average value, variation from the average value, and frequency analysis data of recorded physical amount as an analysis result of the physical amount;
 a determining step of comparing the analysis result with a reference value and determining whether or not maintenance is needed based on a comparison result; and
 a displaying step of displaying a determination result.

* * * * *